United States Patent
Morton

[11] Patent Number: 6,079,951
[45] Date of Patent: Jun. 27, 2000

[54] BIRD BATH FOUNTAIN

[75] Inventor: Paul H Morton, Satellite Beach, Fla.

[73] Assignee: P.H. Morton Co., Inc., Satellite Beach, Fla.

[21] Appl. No.: 09/208,249

[22] Filed: Dec. 9, 1998

[51] Int. Cl.[7] .................................................. F04B 49/04
[52] U.S. Cl. ............................ 417/40; 417/79; 119/69.5; 119/72; 119/78
[58] Field of Search ................................ 417/40; 119/419, 119/537, 81, 256, 69.5, 261; 137/566, 446; 239/23, 17; 222/108; 210/169, 197; 261/77

[56] References Cited

U.S. PATENT DOCUMENTS

| | | |
|---|---|---|
| 1,456,013 | 5/1923 | Smythe . |
| 1,550,408 | 8/1925 | Witt . |
| 3,557,756 | 1/1971 | Ramsey .................................. 119/419 |
| 3,696,786 | 10/1972 | Garwood ............................... 119/69.5 |
| 3,814,318 | 6/1974 | Michaelis ................................. 239/23 |
| 3,967,588 | 7/1976 | Brown .................................... 119/537 |
| 4,030,521 | 6/1977 | Karlsson ................................. 137/566 |
| 4,133,345 | 1/1979 | Mitchell ................................. 137/446 |
| 4,144,841 | 3/1979 | Bliss et al. ............................. 119/261 |
| 4,240,606 | 12/1980 | Johnson . |
| 4,265,599 | 5/1981 | Morton . |
| 4,305,700 | 12/1981 | Beard . |
| 4,335,836 | 6/1982 | Harvill ................................... 222/108 |
| 4,362,126 | 12/1982 | Ellerstorfer et al. . |
| 4,380,419 | 4/1983 | Morton . |
| 4,591,094 | 5/1986 | Morris ..................................... 239/17 |
| 4,720,246 | 1/1988 | Morton . |
| 4,770,126 | 9/1988 | Hostetler ................................. 119/81 |
| 5,139,659 | 8/1992 | Scott ...................................... 210/169 |
| 5,476,068 | 12/1995 | Townsend .............................. 119/256 |
| 5,480,593 | 1/1996 | Marcum et al. ........................ 261/77 |
| 5,678,600 | 10/1997 | Locke et al. . |
| 5,720,876 | 2/1998 | Mackrie et al. ....................... 210/197 |
| 5,743,212 | 4/1998 | Forjohn ................................. 119/69.5 |
| 5,782,035 | 7/1998 | Locke et al. . |
| 5,784,998 | 7/1998 | Manzer ................................ 119/69.5 |
| 5,845,605 | 12/1998 | Malamphy ........................... 119/69.5 |

Primary Examiner—Teresa Walberg
Assistant Examiner—Leonid Fastovsky
Attorney, Agent, or Firm—Harold Gell

[57] ABSTRACT

An animal watering system, such as a bird bath, incorporating a water reservoir, a means to automatically maintain the level of water in the reservoir by admitting fresh water thereto, an animal access basin positioned above the water reservoir whereby water overflowing the basin enters the reservoir, an air lift pump for transporting water from the reservoir to the basin by way of a fountain head and fountain catch basin, and an air compressor for providing a source of compressed air to operate the air lift pump.

20 Claims, 1 Drawing Sheet

BIRD BATH FOUNTAIN

BACKGROUND OF THE INVENTION

1. Field of the Invention

This invention relates to a bird bath with an automatic water level control and air lift fountain.

2. Discussion of the Related Art

Providing water to attract birds is a popular practice in rural, suburban and urban communities. Unfortunately, pressures imposed by modern civilization have resulted in severe demands on most individuals time. This results in neglected low priority tasks such as keeping bird water sources, usually in the form of bird baths, filled with fresh water. This defeats the purpose of establishing bird baths to attract birds by providing fresh water sources which also contribute to the well-being of birds and humans alike.

When a bird bath is allowed to go dry, the resident bird population moves to a new site and the insect population increases. When the water in a bird bath is allowed to become stagnant, it quickly becomes contaminated and a breeding ground for mosquitoes and a multitude of diseases which disseminate the bird population and are harmful to humans as well.

Attempts to solve the foregoing problems have been made by providing an automatic water source for bird baths. One such attempt is described in U.S. Pat. No. 5,782,035 for "Multi-Purpose Automatic Filling and Leveling Fluid Basin with Water Transfer". In this attempt, a fluid diaphragm valve, such as the type used in toilets and described in U.S. Pat. No. 4,240,606, regulates water flow into a basin which may be adapted to function as a bird bath. Unfortunately there is no means to eliminate contamination caused by bird excrement. The water level in the basin is maintained constant but it quickly becomes stagnant and a breeding ground for mosquitoes.

Another example of an attempt to improve bird baths is presented in U.S. Pat. No. 4,362,126 for "Bird Shower". This Patent teaches the concept of a pressure sensitive switch adapted to energized an electric motor which drives a pump to transfer water from a reservoir to a shower head. This device eliminates stagnation of the water but does not solve the problem of maintaining water in the reservoir.

SUMMARY OF THE INVENTION

The foregoing deficiencies in the prior art are solved by the present invention, wherein a pressure responsive fluid diaphragm valve maintains the water level in a closed and protected reservoir and an air lift pump transfers water from the reservoir via a bird attracting, pulsating fountain to an animal watering basin, such as a bird bath basin.

OBJECTIVES OF THE INVENTION

A primary objective of the invention is to provide a water reservoir which is automatically filled to maintain a predetermined level combined with an air lift pump to transfer water from the reservoir to a shallow animal access basin from which the overflow returns to the reservoir.

Another objective of the invention is to provide a means to transfer water from a reservoir to a bird bath without the use of electricity at the site of the reservoir or bird bath.

An important objective of the invention is to recirculate, filter and aerate water in an animal access basin to thereby enhance the potability of the water.

A still further objective of the invention is to provide an air lift pump powered by a remote pneumatic source for transferring water to a bird bath.

Another objective of the invention is to circulate water in a bird bath by pumping it through a fountain.

Another objective of the invention is to attract animals to a water basin by recirculating the water therein by pumping it through a fountain providing a pulsating, dancing discharge.

These objectives, together with other objectives and advantages which will become apparent, resided in details of the apparatus, method and operation as more fully described and claimed hereinafter, reference being had to the accompanying drawings forming a part hereof, wherein like reference designators refer to like parts throughout.

DESCRIPTION OF THE PREFERRED EMBODIMENTS

Figure 1:
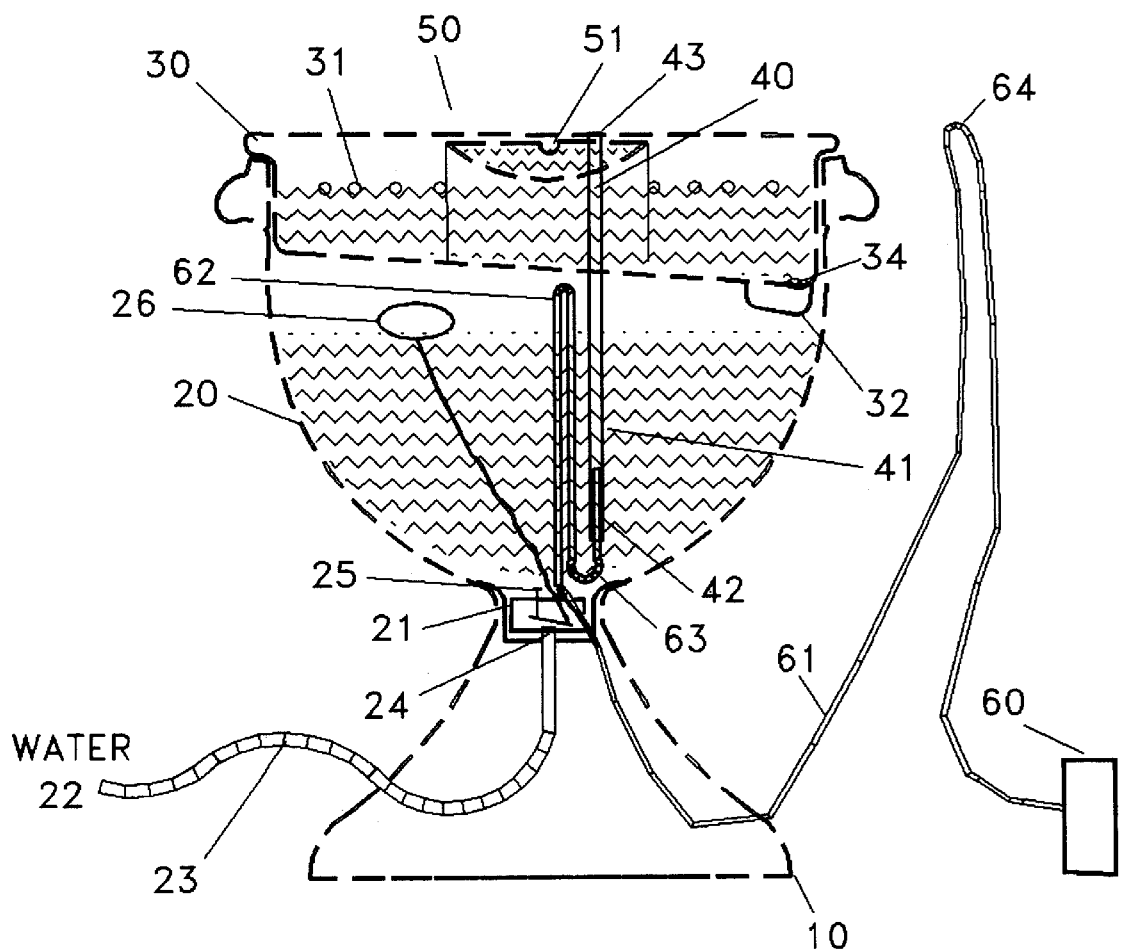
FIG. 1 is a phantom view of an exemplary embodiment of the present invention illustrating the water reservoir, fountain, fountain basin, animal watering basin in the form of a bird bath basin, air lift pump and pressures sensitive compressor.

The invention is described herein as it applies to an animal watering basin in the form of a bird bath. This is done for illustrative purposes only. It is not to be construed as limiting for the invention also applies to watering devices for all forms of land animals.

FIG. 1 illustrates the invention by way of a phantom view to more clearly portray the various components and indicate their inter-relationship. The bird bath is comprised of three structural components. A base, 10, which supports a water reservoir, 20, and conceals the air and water connections thereto. The water reservoir, 20, conceals the pressure responsive valve 21, filter 34 and plumbing associated with the air lift pump and supports the animal access basin, which in the best mode exemplary embodiment is a bird bath basin, 30.

The water reservoir, 20, is kept full by an automatic valve, 21, which may be a simple float operated device, but in a preferred embodiment, it is a pressure responsive fluid diaphragm valve such as described in U.S. Pat. No. 4,240,606 and incorporated herein by reference. A water source, 22, which may be any convenient water supply such as a hose bib, is connected via a hose, 23, to the input, 24, of the valve 21. The valve includes an adjustment means, 25, to set the pressure, and thereby the water level in the reservoir. Alternately, a float, 26, may be used to control the valve operation and thereby the water level.

An air lift pump, 40 (comprised of a tube, 41, a fountain head, 43, and an air inlet, 42) pumps water from the reservoir, 20, into the fountain catch basin, 50. The air lift pump functions in response to compressed air generated by the remote air compressor, 60. In the preferred embodiment, the compressor is a simple vibrating type compressor commonly used by home aquarists. In alternate embodiments, compressed air may be provided by any source, such as a wind driven compressor, tide motor, piston compressor, centrifugal compressor or any other such means. If it is electrically powered, it may be located within a building or similar structure where a convenient source of electricity is available to power the compressor. Compressed air generated by the compressor is conveyed by an air tube, 61, arranged to form a loop, 64, above the highest level of water in the reservoir as protection against siphoning, to an anti-syphon coupling 62 in the form of an inverted "U" positioned such that the upper most segment is above the water level in the reservoir. The anti-syphon coupling connects the air line, 61, to the air inlet, 42, via a short, flexible air line section, 63. The air inlet, 42, is an open-ended air line located within the bottom of the air lift pump tube, 41. The air inlet, when connecting a source of compressed air to the bottom of the tube 41, changes the static pressure head within the tube and thereby causes water to be pumped up through the tube and out the top fountain head 43 in spurts as a pulsating or dancing fountain. The air inlet is dimension so that water will flow into the bottom of the tube 41 and up and around the air inlet so that air flowing out of the inlet rises in the tube 41 with the water above the air inlet. Thus the water flow from the top of the pump is interrupted by pockets of air, causing the water flow out of the fountain head, 43, to be discharged in spurts as a dancing fountain of water.

The dancing discharge of water from the fountain head, 43, acts as a powerful bird attractant as it flows into the fountain basin 50. When the water level in the fountain basin reaches the discharge spout 51, it flows into the bird bath basin, 30, as a water fall to further aerate the water and keep contaminates in suspension so they may be filtered out during recirculation. The bird bath basin, 30, as can be seen in FIG. 1, has a sloping bottom with a drain, 34, at the lower most point. This drain, 34, is located at the lower end of the bird bath basin so that particulate contaminants, which are denser than water, will be gently moved across the bottom and out the drain hole in response to the agitation created by the water fall. A particulate collector, 32, in a form of a filter which may include charcoal as a water purifying agent, is attached under the bird bath basin to collect water draining from the drain hole 34.

The water flows through drain 34 at a rate slower than the air lift pump out flow. Therefore, the water level in the bird bath basin rises. When the water level in the bird bath basin, 30, reaches the drain holes 31, it overflows into the reservoir, 20, to be recycle with the water from the drain 34 by the air lift pump 40. In situations where the operation of the air compressor 60 is intermittent, the drain 34 may be plugged to prevent the bird bath basin from emptying while the air compressor is off.

The apparatus thus far described provides a means to enable a method for providing fresh, clean water for birds and other animals. The method includes the steps of 1) regulating the flow of replenishment water from a source to a reservoir. 2) Transporting water from the reservoir via an air lift pump to a fountain head by creating a fountain discharge which varies in amplitude and emulates a dancing water column by introducing air into the section of a hollow tube which is the lower part of the air lift pump that is submerged in the reservoir and thereby changing the pressure head within the hollow tube, causing water to be discharged from the top of the tube as an irregular pulsating flow. 3) Collecting water from the fountain head in a fountain basin and discharging it therefrom into an animal access basin (bird bath) while simultaneously mixing water in the basins to keep contaminants in motion while simultaneously aerating the water to enhance its potability. 4) Draining water across the bottom of the animal access basin and out a bottom drain. 5) Filtering and purifying water from the bottom drain by passing it through a filter media and charcoal bed. 6) Removing surplus water, water not removed via the drain from said animal access basin, as an overflow discharge. 7) Collecting the filtered and purified water from the bottom drain and overflow water from the animal access basin, i.e., bird bath, in the reservoir and 8) recycling it via the air lift pump.

The foregoing is considered as illustrative only of the principles of the invention. Further, since numerous modifications and changes will readily occur to those skilled in the art, it is not desired to limit the invention to the exact construction shown and described, and accordingly, all suitable modifications and equivalents may be resorted to, falling within the scope of the invention and the appended claims and their equivalents.

What is claimed is:

1. A bird bath, comprising:

a water reservoir;

a bird bath basin;

a water level control valve for controlling the level of water in said water reservoir by admitting fresh water as needed to maintain said water level; and an air lift pump for transferring water from said water reservoir into said bird bath basin.

2. A bird bath as defined by claim 1, comprising:

a fountain head located above the level of water in said reservoir and supplied with water from said reservoir by said air lift pump.

3. A bird bath as defined by claim 2, comprising:

a fountain basin for collecting water discharged by said fountain head.

4. A bird bath as defined by claim 3, comprising:

a water discharge in said fountain basin for directing overflow water from said fountain basin into said bird bath basin.

5. A bird bath as defined by claim 4, comprising:

overflow recirculating means for channeling overflow water from said bird bath basin into said water reservoir.

6. A bird bath as defined by claim 4, comprising:

a drain located a the lowest point of said bird bath basin: and means for collecting particulate contaminants from water flowing from said drain and discharging the thus filtered water into said water reservoir.

7. A bird bath as defined by claim 5, comprising:

a source of compressed air for driving said air lift pump; and an anti-syphon means between said source of compressed air and said air lift pump.

8. A bird bath as defined by claim 7, wherein said source of compressed air is an electrically driven air compressor located remotely from said water reservoir and said bird bath basin and an air line connecting said source of air compressor to said anti-syphon means.

9. A bird bath as defined by claim 8, wherein said air line includes a loop positioned higher than the highest water level possible in said reservoir.

10. A bird bath as defined by claim 1, wherein said air lift pump comprises:

a tube with an open bottom end positioned below the water level in said reservoir;

an air inlet positioned in a bottom section of said tube and below the water level of said reservoir; and a top end comprising said fountain head.

11. A bird bath as defined by claim 10, wherein said automatic water level control valve is a pressure responsive fluid diaphragm valve.

12. A bird bath as defined by claim 10, wherein said automatic water level control valve is a float controlled valve.

13. A method for providing water for animals, including the steps of:

regulating the flow of replenishment water from a source into a reservoir;

transporting water from said reservoir via an air lift pump to a fountain head;

collecting water discharged from said fountain head in a fountain basin;

discharging surplus water collected in said fountain basin into an animal access basin; and collecting water flowing from said animal access basin in said reservoir.

14. A method for providing water for animals as defined by claim 13, wherein said step of transporting water from said reservoir to a fountain head includes the further steps of:

creating a fountain discharge which varies in amplitude and emulates a dancing water column by introducing air into the section of a hollow tube comprising said air lift pump which is submerged in said reservoir and thereby changing the pressure head within said hollow tube and causing water to be discharged from the top of said tube as an irregular pulsating flow.

15. A method for providing water for animals as defined by claim 13, including the step of filtering contaminants from said water flowing from said animal access basin.

16. An animal watering apparatus, comprising:

a water reservoir;

an animal access basin;

a water level control valve for controlling the level of water in said water reservoir by admitting fresh water as needed to maintain said water level;

a tube with an open bottom end positioned below the water level in said reservoir;

means for admitting compressed air into the bottom of said tube;

a top end comprising a fountain head for discharging water from said tube into said animal access basin; and recirculating means for channeling water from said animal access basin into said water reservoir.

17. An animal watering apparatus as defined by claim 16, comprising:

a source of compressed air pneumatically connected to said means for admitting compressed air into the bottom of said tube.

18. An animal watering apparatus as defined by claim 17, wherein said means for pneumatically connecting said source of compressed air to said means for admitting compressed air into the bottom of said tube is an air line including a loop above the highest water level obtainable in said water reservoir.

19. An animal watering apparatus as defined by claim 18, comprising:

a fountain basin for collecting water discharged by said fountain head; and a water discharge in said fountain basin for directing overflow water from said fountain basin into said animal access basin.

20. An animal watering apparatus as defined by claim 19, comprising:

means for collecting particular contaminants from water flowing from said recirculating means into said water reservoir.

* * * * *